(12) United States Patent
Korenev (10) Patent No.: US 8,783,112 B2
(45) Date of Patent: Jul. 22, 2014

(54) GAS MONITORING SYSTEM IMPLEMENTING PRESSURE DETECTION

(75) Inventor: Sergey Korenev, Mundelein, IL (US)

(73) Assignee: Caterpillar Inc., Peoria, IL (US)

( * ) Notice: Subject to any disclaimer, the term of this patent is extended or adjusted under 35 U.S.C. 154(b) by 427 days.

(21) Appl. No.: 13/174,468

(22) Filed: Jun. 30, 2011

(65) Prior Publication Data

US 2013/0000412 A1    Jan. 3, 2013

(51) Int. Cl.
*G01L 9/00*    (2006.01)
*G01N 27/00*    (2006.01)

(52) U.S. Cl.
USPC .............................................. 73/753; 73/1.02

(58) Field of Classification Search
None
See application file for complete search history.

(56) References Cited

U.S. PATENT DOCUMENTS

| | | | |
|---|---|---|---|
| 3,559,049 A | | 1/1971 | Liebermann et al. |
| 4,260,884 A | | 4/1981 | Lovelock |
| 4,272,995 A | * | 6/1981 | Weistra ...................... 73/861.09 |
| 4,665,690 A | | 5/1987 | Nomoto et al. |
| RE32,552 E | | 12/1987 | Liebermann et al. |
| 4,916,384 A | * | 4/1990 | Ishida .......................... 324/71.4 |
| 5,475,311 A | | 12/1995 | Cho et al. |
| 5,567,882 A | | 10/1996 | Ichimura et al. |
| 5,591,896 A | | 1/1997 | Lin |
| 6,266,993 B1 | * | 7/2001 | Diehl et al. ..................... 73/1.06 |
| 6,457,347 B1 | | 10/2002 | Koo et al. |
| 7,047,815 B2 | * | 5/2006 | Sashinami et al. ............... 73/718 |
| 7,086,288 B2 | * | 8/2006 | Lee et al. ......................... 73/718 |
| 7,367,233 B2 | | 5/2008 | Nagasawa et al. |
| 7,416,650 B2 | * | 8/2008 | Hatada et al. ................. 204/406 |
| 7,426,848 B1 | | 9/2008 | Li et al. |
| 7,445,700 B2 | * | 11/2008 | Kato et al. ..................... 204/428 |
| 7,529,633 B1 | | 5/2009 | Schipper et al. |
| 7,832,254 B2 | | 11/2010 | Guenschel et al. |

(Continued)

FOREIGN PATENT DOCUMENTS

| | | |
|---|---|---|
| DE | 10229411 A1 | 1/2004 |
| DE | 102004007647 B4 | 4/2006 |

(Continued)

OTHER PUBLICATIONS

U.S. Appl. No. 13/174,373, filed Jun. 30, 2011.

(Continued)

*Primary Examiner* — Lisa Caputo
*Assistant Examiner* — Jermaine Jenkins
(74) *Attorney, Agent, or Firm* — Finnegan, Henderson, Farabow, Garrett & Dunner LLP (57) ABSTRACT

A gas monitoring system is disclosed. The gas monitoring system may have a first electrode in fluid communication with a first gas and a second gas, and a second electrode spaced apart from the first electrode to contain the second gas between the first and second electrodes. The gas monitoring system may also have a pulse generator configured to apply a series of voltage pulses to the first and second electrodes and create a plasma in the second gas. Each voltage pulse in the series of voltage pulses may have an incrementally higher voltage amplitude than a preceding voltage pulse in the series of voltage pulses. The gas monitoring system may further have a detection controller in communication with the pulse generator. The detection controller may be configured to detect breakdown of the second gas during application of one of the series of voltage pulses, and based on a voltage amplitude of the one of the series of voltage pulses, determine a parameter of the first gas.

20 Claims, 4 Drawing Sheets

(56) References Cited

U.S. PATENT DOCUMENTS

| | | | |
|---|---|---|---|
| 7,955,494 B2* | 6/2011 | Kawase et al. | 205/785 |
| 8,268,147 B2* | 9/2012 | Ieda et al. | 204/431 |
| 8,402,812 B2* | 3/2013 | Sasaki | 73/23.2 |
| 2006/0251543 A1 | 11/2006 | Koratkar et al. | |
| 2007/0261471 A1 | 11/2007 | Kondo et al. | |
| 2010/0229632 A1 | 9/2010 | Tokuda et al. | |
| 2010/0229724 A1 | 9/2010 | Tokuda et al. | |
| 2011/0128010 A1 | 6/2011 | Gianchandani et al. | |
| 2012/0272721 A1* | 11/2012 | Kochupurackal et al. | 73/31.06 |

FOREIGN PATENT DOCUMENTS

| | | |
|---|---|---|
| EP | 0715158 | 6/1996 |
| GB | 905626 A | 9/1982 |
| JP | 56-147031 | 11/1981 |
| JP | 1984171826 A | 9/1984 |
| JP | 1985123761 A | 7/1985 |
| JP | 1999258088 A | 9/1999 |
| JP | 2006300578 A | 11/2006 |
| JP | 4574411 B2 | 11/2010 |
| RU | 2146361 C1 | 3/2000 |
| SU | 426182 A1 | 4/1974 |
| SU | 655954 A1 | 4/1979 |
| SU | 729496 A1 | 4/1980 |
| WO | WO 03034053 A2 | 4/2003 |

OTHER PUBLICATIONS

U.S. Appl. No. 13/174,418, filed Jun. 30, 2011.
U.S. Appl. No. 13/174,450, filed Jun. 30, 2011.
Guohua et al., "Carbon Nanotube Gas Sensor Based on Corona Discharge," *Chinese Journal of Analytical Chemistry*, vol. 34 issue 12, (2006) 1813-1816.
Kim, "Sensors based on Paschen's law using carbon nanotubes as electron emitters," *J. Phys. D: Appl. Phys.*,39 (2006) 3026-3029.
Wu et al., "A MEMS-based ionization gas sensor using carbon nanotubes and dielectric barrier," *Proceedings of the 3rd IEEE International Conference on Nano/Micro Engineered and Molecular Systems*, Jan. 6-9, 2008, Sanya, China 824-827.
Sim, et al., "Multi-purpose ionization gas sensing devices using carbon nanofibers on plastic substrates," *Diamond & Related Materials*, 17 (2008) 1959-1962.
Hou et al., "MEMS-based microelectrode system Incorporating carbon nanotubes for ionization gas sensing," *Sensors and Actuators B*, 127 (2007) 637-648.
Modi et al., "Miniaturized gas Ionization sensors using carbon nanotubes," *Nature*, 424 (2003) 171-175.
Hui et al., "A novel gas-ionization sensor based on aligned multi-walled carbon nanotubes," *Measurement Science and Technology*, 17 (2006) 2799-2805.
Liao et al., "A novel gas sensor based on field ionization from ZnO nanowires: moderate working voltage and high stability," *Nanotechnology*, 19 (2008) 175501.
Nikfarjam et al., "Fabrication of gas Ionization sensor using carbon nanotube arrays grown on porous silicon substrate," *Sensors and Actuators A*, 162 (2010) 24-28.
Yong et al., "Study of improving identification accuracy of carbon nanotube film cathode gas sensor," *Sensors and Actuators A*, 125 (2005) 15-24.
Malik et al., "A review of electrical breakdown in mixtures of SF6 and other gases," *IEEE Trans. Electr. Insul*, vol. EI-14 No. 1 (1979) 1-13.
Allan, "Carbon nanotube promise a simple approach to making gas sensors," *Small Times*, vol. 8, issue 3 (2008).
Diaz, "Miniaturized Gas Ionization Sensors using Nanomaterials," University of Puerto Rico, Graduate Chemistry Department, Graduate Seminar, Mar. 11, 2009.
Johannes et al., "Procedure and device for the monitoring of the particle concentration in a gas flow" Machine translation of DE102004007647B4.
Bernhard et al., "Procedure for determining the particle portion in a gas flow" Machine translation of DE10229411A1.
Hiroshi et al., "Capacitance type pressure sensor and vacuum degree evaluation method of vacuum chamber thereof" Machine translation of JP2006300578A.
Katsuyama et al., "A soot detection sensor and a soot detecting method" Machine translation of JP04574411B2.

* cited by examiner

Fig. 4

GAS MONITORING SYSTEM IMPLEMENTING PRESSURE DETECTION

TECHNICAL FIELD

The present disclosure is directed to a gas monitoring system and, more particularly, to a gas monitoring system implementing pressure detection.

BACKGROUND

Internal combustion engines, including diesel engines, gasoline engines, gaseous fuel-powered engines, and other engines known in the art exhaust a complex mixture of air pollutants. These air pollutants are composed of gaseous compounds, such as the oxides of nitrogen ("$NO_x$"), the oxides of sulfur ("$SO_x$"), CO, $CO_2$, $NH_3$, and soot (particulate matter or "PM"). Due to increased awareness of the environment, exhaust emission standards have become more stringent, and the amounts of many of these pollutants emitted from an engine may be regulated depending on the type of engine, size of engine, and/or class of engine.

One method that has been implemented by engine manufacturers to comply with the regulation of engine exhaust pollutants has been to detect different parameters of the exhaust gas (e.g., pressure), and then treat the exhaust gas through various reduction, conversion, and trapping processes based on the detected parameters. Many different types of parameter sensors are currently available for this use. Common sensors used to detect pressure include thermal, ionization, piezoelectric, electromagnetic, and optical pressure sensors. Although functional, some of these architectures may have problems in exhaust gas environments, as their sensing mechanisms can be fouled by soot in the exhaust gas.

One attempt to improve gas pressure detection is described in U.S. Patent Application Publication No. 2011/0128010 (the '010 publication) of Gianchandani et al. The '010 publication is directed toward microdischarge-based pressure sensors that includes an anode, one or more cathodes, a drive circuit connected to the anode and cathode(s), and a measurement circuit that permits sensing of transient current pulses flowing between the anode and cathode(s). In the dual cathode embodiment, one of the cathodes is interposed between the anode and another cathode, and it includes a central opening that permits a microdischarge to occur between the anode and each cathode in response to applied voltage pulses from the drive circuit. Changes in relative current between the two cathodes are measured and used to indicate changes in ambient pressure in the microdischarge chamber. In other embodiments, one of the cathodes acting as a diaphragm, which deflects based on external pressure to change its inter-electrode spacing, thereby altering the relative cathode currents.

There may be limitations to the '010 publication's approach that may inhibit commercialization. For example, the '010 publication advocates monitoring a cathode current to determine changes in pressure, and monitoring current can be problematic. In particular, the current pulses in the '010 publication are generally less than 50 nanoseconds and such short pulses generally require custom built current transformers in order to generate accurate current measurements. Additionally, the current signal may be weak, making it difficult to distinguish from electrical noise in the system.

The pressure detection system of the present disclosure addresses one or more of the problems set forth above and/or other problems of the prior art.

SUMMARY

In one aspect, the present disclosure is related to a gas monitoring system. The gas monitoring system may include a first electrode in fluid communication with a first gas and a second gas, and a second electrode spaced apart from the first electrode to contain the second gas between the first and second electrodes. The gas monitoring system may also include a pulse generator configured to apply a series of voltage pulses to the first and second electrodes and create a plasma in the second gas. Each subsequent voltage pulse in the series of voltage pulses may have an incrementally higher voltage amplitude than a preceding voltage pulse in the series of voltage pulses. The gas monitoring system may further include a detection controller in communication with the pulse generator. The detection controller may be configured to detect breakdown of the second gas during application of one of the series of voltage pulses, and based on a voltage amplitude of the one of the series of voltage pulses, determine a parameter of the first gas.

In another aspect, the present disclosure is related to a method for monitoring a first gas. The method may include applying a series of voltage pulses to electrodes having a contained second gas therebetween, wherein each subsequent voltage pulse in the series of voltage pulses has an incrementally higher voltage amplitude than a preceding voltage pulse in the series of voltage pulses. The method may also include detecting breakdown of the second gas during application of one of the series of voltage pulses and, based on a voltage amplitude of the one of the series of voltage pulses, determining a pressure of the first gas.

In yet another aspect, the present disclosure is related to a pressure sensor. The pressure sensor may include a first generally cuplike electrode and a second electrode. The second electrode operatively coupled to the first electrode to enclose a reference gas, the second electrode being flexible and configured to reduce a discharge gap between the first and second electrodes as an external pressure acting on the first and second electrodes increases.

DETAILED DESCRIPTION

Figure 1:
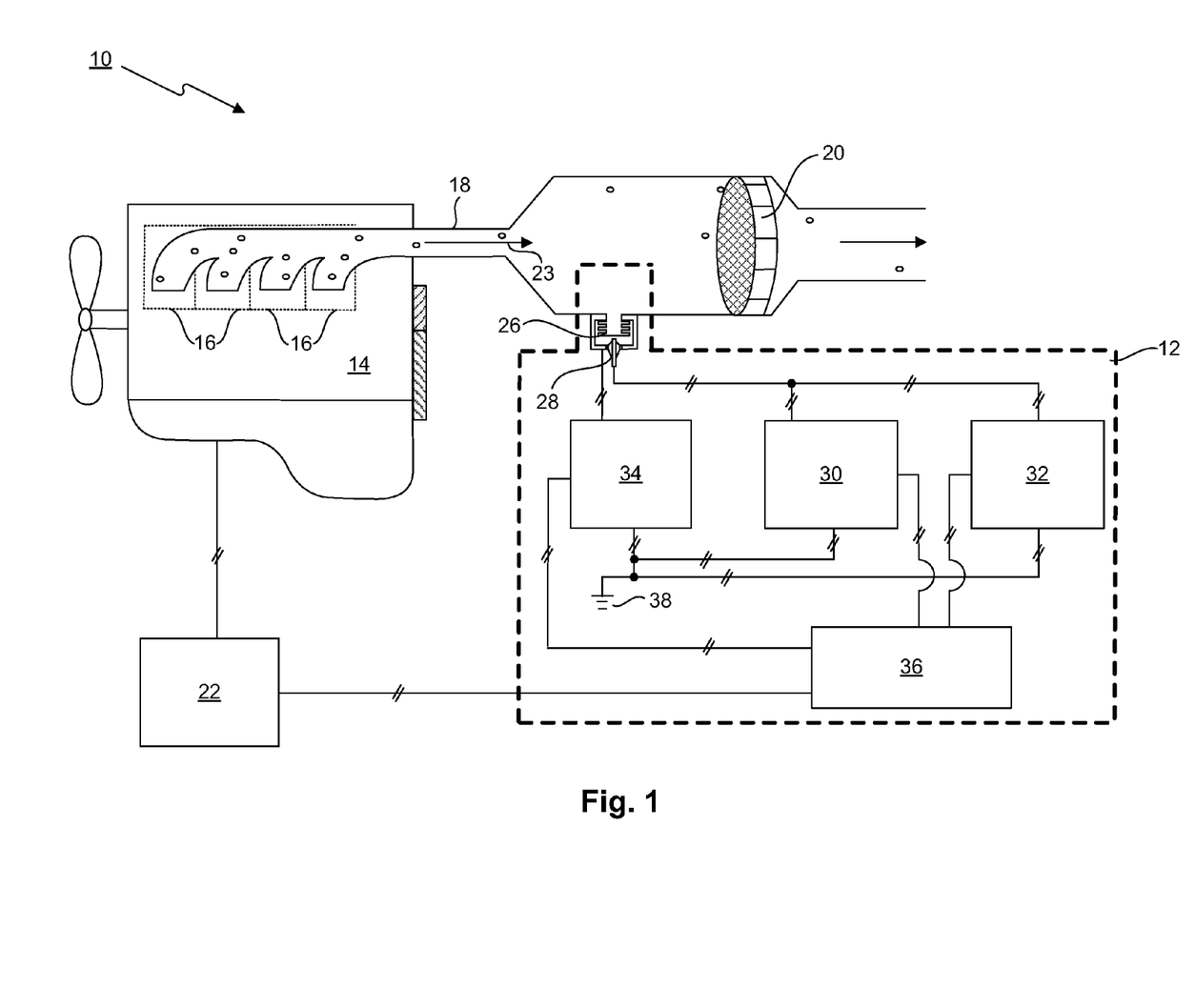
FIG. 1 is a diagrammatic illustration of an exemplary disclosed power system.

FIG. 1 illustrates an exemplary power system 10 incorporating a gas monitoring system 12 consistent with this disclosure. For the purposes of this disclosure, power system 10 is depicted and described as an internal combustion engine, for example a gasoline, diesel, or gaseous fuel-powered engine that draws in a flow of combustion gases and produces a flow of exhaust gas 23. However, it is contemplated that power system 10 may embody any other type of gas producing, treating, and/or handling system known in the art where detection of particular constituents within the associated gas is desired.

Power system 10, as an internal combustion engine, may include an engine block 14 that at least partially defines a plurality of cylinders 16, and a plurality of piston assemblies (not shown) disposed within cylinders 16. Cylinders 16, together with the pistons, may form a plurality of combustion chambers. It is contemplated that power system 10 may include any number of combustion chambers and that the combustion chambers may be disposed in an "in-line" configuration, a "V" configuration, or in any other conventional configuration. An exhaust passage 18 may extend from the combustion chambers to the atmosphere, and one or more different treatment devices 20 (e.g., particulate filters, reductant injectors, catalysts, attenuation devices, etc.) may be disposed within exhaust passage 18.

In some embodiments, power system 10 may be equipped with a general system controller 22. In these embodiments, system controller 22 may be configured to regulate operations of power system 10, for example fuel injection, boosting, gas mixing, valve timing, exhaust gas recirculation, reductant dosing, and other operations, to affect production of regulated constituents and/or their discharge to the atmosphere.

Figure 2:
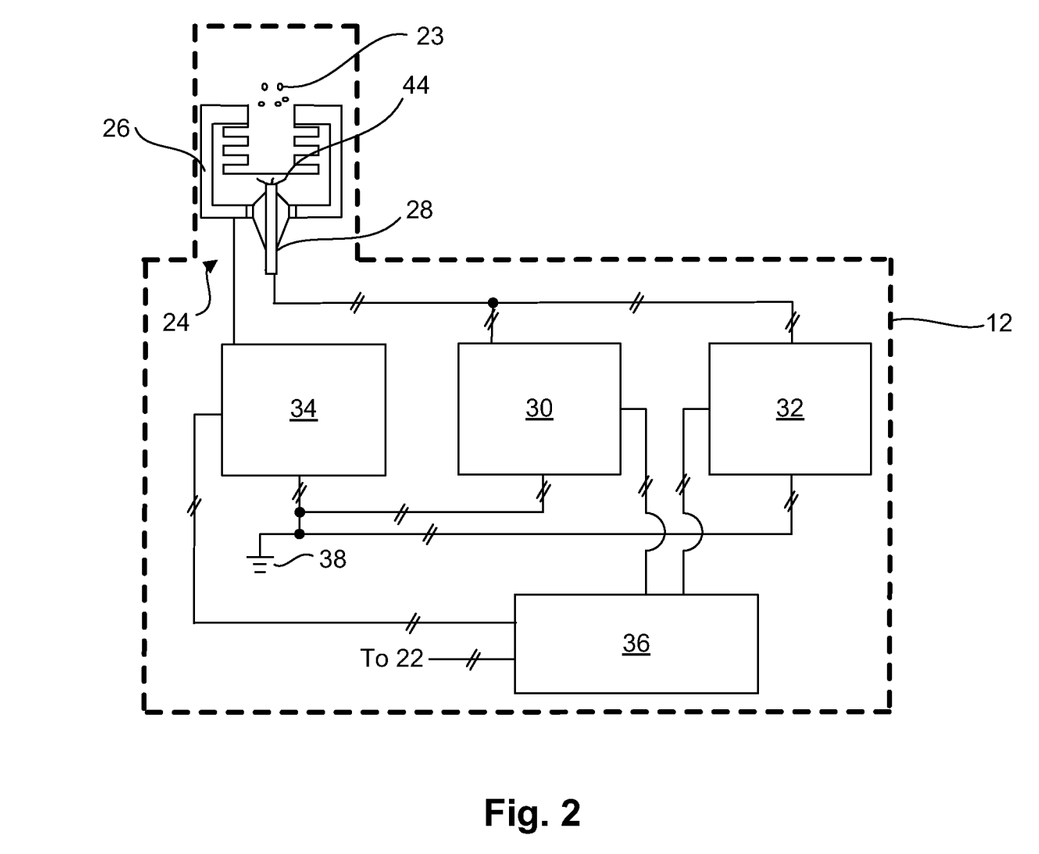
FIG. 2 is a diagrammatic illustration of an exemplary disclosed gas monitoring system that may be used in conjunction with the power system of FIG. 1.

As shown in FIG. 2, gas monitoring system 12 may include components that cooperate to detect a parameter of the exhaust gas 23 of power system 10 flowing through exhaust passage 18. The detected parameter may then be utilized by system controller 22 to help regulate the different operations of power system 10. Gas monitoring system 12 may include, among other things, electrodes 24 (including at least one anode 26 and at least one cathode 28), a pulse generator 30, a voltage measurement device 32, a current measurement device 34, and a detection controller 36. Pulse generator 30, voltage measurement device 32, current measurement device 34, and detection controller 36 may be located anywhere onboard or in the immediate proximity to power system 10, and be in communication with each other, with electrodes 24, and/or with system controller 22.

Anode 26 may embody a conductive element, for example an element composed of carbon nanotubes, carbon fibers, stainless or non-stainless steel, tantalum, platinum, tungsten, silver, gold, high-nickel alloys, copper, or other conductive elements. During normal operation (e.g., when a negative voltage is applied to electrodes 24) anode 26 may be connected to an electrical ground 38, such as an earth ground, or other ground. In other operations (e.g., when a positive voltage is applied to electrodes 24), the anode 26 may be insulated from ground 38 via an insulator 40.

Cathode 28 may also embody a conductive element substantially similar to anode 26. However, cathode 28, in contrast to anode 26 may be insulated from ground 38 via insulator 40 during normal operations, and connected to ground 38 during the other operations. Additionally, depending on the particular geometry of cathode 28 and/or anode 26, it may be necessary to insulate portions of cathode 28 from anode 26. Insulator 40 may include, for example, a material fabricated from aluminum oxide, aluminum nitride, porcelain, boron nitride, or other insulating elements.

Figure 3:
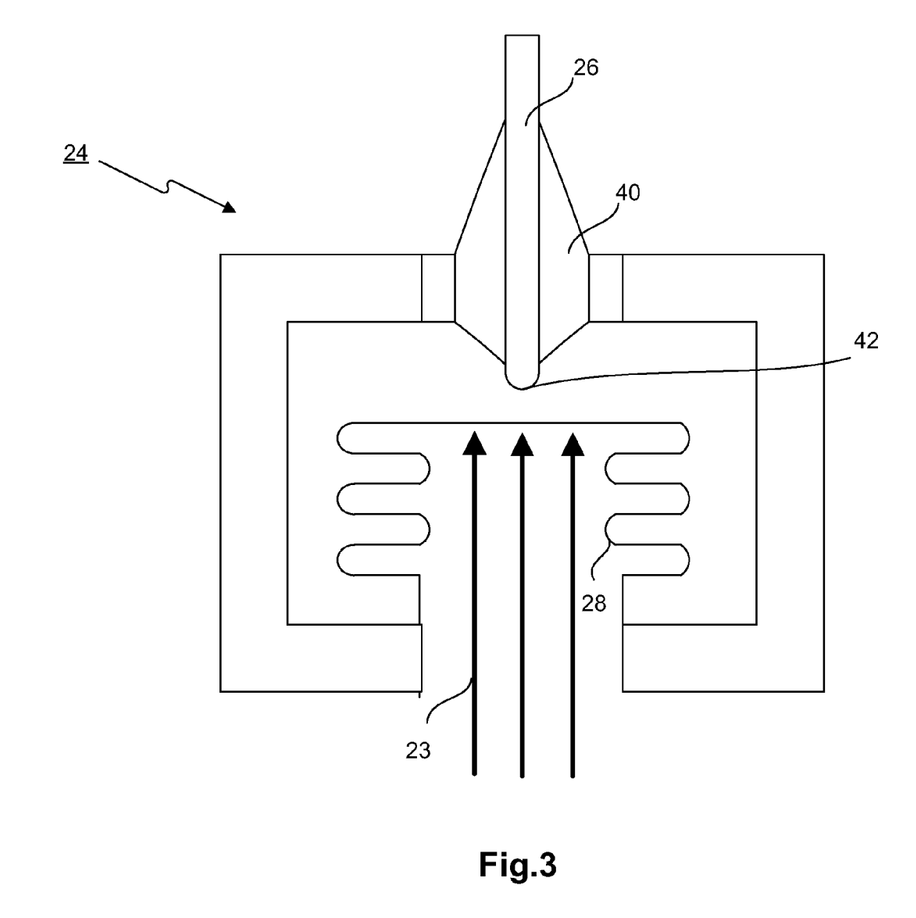
FIG. 3 is a schematic and diagrammatic illustration of an exemplary disclosed pressure detection sensor.

FIG. 3 illustrates an exemplary embodiment of electrodes 24. A discharge gap 42 may be substantially sealed from exhaust passage 18, and filled with a contained reference gas (e.g., air, nitrogen, argon, helium, etc.) such that any discharge occurring between anode 26 and cathode 28 will be in the reference gas and not in the exhaust gas 23. In addition, cathode 28 may be generally cuplike so that cathode 28 is internally exposed to the exhaust gas 23 and externally exposed to the reference gas. Cathode 28, in this configuration, may be relatively flexible and configured to extend toward anode 26 and reduce the discharge gap 42 as the pressure of the exhaust gas 23 increases, and vice versa. In some embodiments, cathode 28 may be configured to have a bellows like structure to provide the flexibility discussed above. An elasticity of cathode 28 may be known such that, as flexure of cathode 28 occurs, a magnitude of the force causing the flexure can be calculated based on a change in the discharge gap 42 and the elasticity. As will be described in more detail below, detection controller 36 may be configured to determine the change in the discharge gap 42 during application of a voltage pulse to electrodes 24 and, from the calculated force, determine a pressure of the exhaust gas 23 pressing in on cathode 28 and causing the change.

Referring back to FIG. 2, the configuration of pulse generator 30 may be based on a capacitive architecture, an inductive architecture, or a combination thereof. A capacitive-based architecture may include of one or more capacitors disposed in series (e.g., a capacitor bank) or in parallel (e.g., a Marx bank). An inductive-based architecture may include one or more magnetic inductors such as an induction coil, also known as an inductive adder. A combination capacitive-inductive architecture may include both inductive and capacitive components coupled to function together through the use of magnetic compression. Additionally, in some embodiments, pulse generator 30 may use one or more transmission lines (e.g., a Blumlien), if desired. Pulse generator 30 may be a stand-alone component (shown in FIG. 2) or, alternatively, form an integral part of detection controller 36, as desired.

Pulse generator 30 may include or be connected to a source of electrical power (not shown). In one example, pulse generator 30 may include an integral energy storage device that functions as the source of electrical power. In another example, the energy storage device may be a separate unit, for example, a bank of one or more capacitors, a bank of one or more inductors, or a combination thereof. The energy storage device, in these embodiments, may be charged by a separate supply voltage (e.g., the voltage from an power system battery, a rectified utility voltage, etc.).

Pulse generator 30 may be controlled to generate and apply one or more positive or negative voltage pulses to electrodes 24 to cause a discharge between cathode 28 and anode 26 and create a plasma 44 in the reference gas, as is explained above with reference to FIG. 3. In some embodiments, pulse generator 30 may be capable of producing a continuous train of discrete pulses (i.e., a series). However, it is contemplated that pulse generator 30 may additionally or alternatively be configured to create one or more positive voltage pulses, as desired.

The output of pulse generator 30, and in particular, one or more of a width, an amplitude, and a frequency of the pulse created by pulse generator 30, may be selectively adjusted by detection controller 36 to help ensure that the plasma 44 is created between anode 26 and cathode 28. For example, the pulse width may be varied within a range of about 0.001-10 milliseconds, while the pulse amplitude may be varied within a range of about 1-5 kV. Similarly, the pulse frequency may range from an isolated pulse to about 10 s of kHz. In general, the pulse width, pulse amplitude, and pulse frequency should be set sufficiently high to ensure formation of plasma 44 between anode 26 and cathode 28 during discharge, such that the plasma is a thermal discharge. The relatively long applied voltage pulse may facilitate ease of measurement of the breakdown voltage.

The output of pulse generator 30 generally produces a thermal discharge (e.g. an arc). However, it is also contemplated in some situations to alternatively generate a non-thermal plasma (e.g., an transient plasma, corona, etc.) between anode 26 and cathode 28 during discharge. Prevention of a thermal plasma between anode 26 and cathode 28 may help to reduce electrode erosion and energy supply requirements of gas monitoring system 12.

Voltage measurement device 32 may embody a voltage divider, for example a resistive or capacitive voltage divider, that is configured to measure an actual voltage across discharge gap 42. Voltage measurement device 32 may be configured to generate a voltage signal indicative of the actual voltage and direct the voltage signal to detection controller 36 for further processing. It is contemplated that voltage measurement device 32 may additionally be configured to provide the voltage signal to another system or device, for example, to system controller 22 (referring to FIG. 1), to an oscilloscope, to an offboard computer, etc., if desired.

Current measurement device 34 may embody a current transformer configured to measure an actual current between anode 26 and cathode 28 during the discharge. Current measurement device 34 may be further configured to generate a current signal indicative of the actual current and direct the current signal to controller 36 for further processing. It is contemplated that current measurement device 34 may additionally be configured to provide the current signal to another system or device, for example, to system controller 22 (referring to FIG. 1), to an oscilloscope, to an offboard computer, etc., as desired.

Detection controller 36 may include a processor (not shown), a memory (not shown), and/or a data interface (not shown). The processor(s) may be a single or multiple microprocessors, field programmable gate arrays (FPGAs), or digital signal processors (DSPs) capable of executing particular sets of instructions. The instructions executed by the processor may be pre-loaded into the processor or may be stored in separate computer-readable memory (not shown) or other separate storage device (not shown), such as a random access memory (RAM), a read-only memory (ROM), a hard disk, an optical disk, a magnetic medium, a flash memory, other permanent memory, other volatile memory, or any other tangible mechanism capable of providing instructions to the processor. Additionally, one or more lookup tables (not shown) may be stored in the processor and/or separate computer-readable memory, as desired, and referenced by the processor during execution of the instructions.

It should be appreciated that detection controller 36 could be dedicated to only pressure detection functions or, alternatively, integral with general system controller 22 (referring to FIG. 1) and be capable of controlling numerous power system functions and modes of operation. If separate from system controller 22, detection controller 36 may communicate with system controller 22 via data links or other methods. Various other known circuits may be associated with detection controller 36, including power supply circuitry, signal-conditioning circuitry, actuator driver circuitry (i.e., circuitry powering solenoids, motors, or piezo actuators), communication circuitry, and other appropriate circuitry. In some embodiments, detection controller 36 may be coupled to input/output devices (e.g., to a monitor, a keyboard, a printer, etc.) to receive input from a user and output information to the user. Detection controller 36 may be configured to communicate with other systems and/or devices, for example, an oscilloscope, a computer, etc., as desired. Additionally, in some embodiments, detection controller 36 may be configured to send control signals or otherwise communicate with one or all of pulse generator 30, voltage measurement device 32, current measurement device 34, and electrodes 24.

The lookup table used by detection controller 36 may include data corresponding to breakdown voltage levels and corresponding discharge gaps 42 for the reference gas. Under normal conditions (i.e., when a voltage pulse is not applied to electrodes 24), the reference gas 23 between anode 26 and cathode 28 may function as an insulator, preventing electricity from being conducted therebetween. However, a period of time after a known pulse of electrical energy having a sufficiently high voltage is first applied to electrodes 24 (i.e., a period of time after a voltage exceeding a dielectric strength of reference gas is applied to electrodes 24), the gas between anode 26 and cathode 28 may "break down" or partially ionize and function as a conductor to conduct the energy from cathode 28 to anode 26. The reference gas may break down when exposed to different levels of voltage, depending on existing gas parameters. Similarly, the reference gas may break down after different periods of time have elapsed following application of the voltage pulse, the elapsed periods of time relating to the parameters of the reference gas. Likewise, given a constant gas pressure, any reduction in discharge gap 42 between anode 26 and cathode 28 may result in a corresponding decrease in the breakdown voltage. The lookup table may store these different voltage values, current patterns (e.g., delay times, spike values, etc.) associated with breakdown, time durations, discharge gaps 42, anode 26 geometry, cathode 28 geometry, and other values, along with corresponding gas parameters. Detected voltage and/or current values associated with the voltage pulse that cause breakdown of the corresponding gas and/or a tracked amount of time to breakdown following application of the known voltage pulse may then be referenced by detection controller 36 with the lookup table to values of the gas parameters. Examples of this operation will be provided in the following section of this disclosure.

Detection controller 36 may regulate operation of pulse generator 30 to selectively generate a voltage pulse having particular characteristics. In particular, detection controller 36 may be configured to dynamically adjust a voltage, a width, and/or a frequency of the pulse generated by pulse generator 30. Alternatively, detection controller 36 may be configured to simply trigger pulse generator 30 to generate one or more pre-determined voltage pulses. Detection controller 36 may then reference signals from voltage measurement device 32 and/or current measurement device 34 at the time of constituent breakdown, along with the elapsed period of time since application of the voltage pulse, with the lookup tables to determine other parameters of the exhaust gas 23. It is contemplated that detection controller 36 may be configured to alternatively calculate the parameters based on the signal from voltage measurement device 32, the signal from current measurement device 34, and the elapsed period of time, without the use of the lookup table, if desired. In some situations, detection controller 36 may benefit from noise reduction and/or filtering on the voltage and current signals during the analysis. Additionally, detection controller 36 may be configured to trend changes in particulate matter concentration over time and/or under different operating conditions of power system 10, as desired.

It is contemplated that detection controller 36 may take specific corrective actions in response to detection of exhaust gas parameter values that exceed threshold levels during comparison by detection controller 36. The corrective actions may include, for example, making adjustments to the operation of power system 10 via system controller 22, activation of alarms or alerts, and other actions known in the art.

Figure 4:
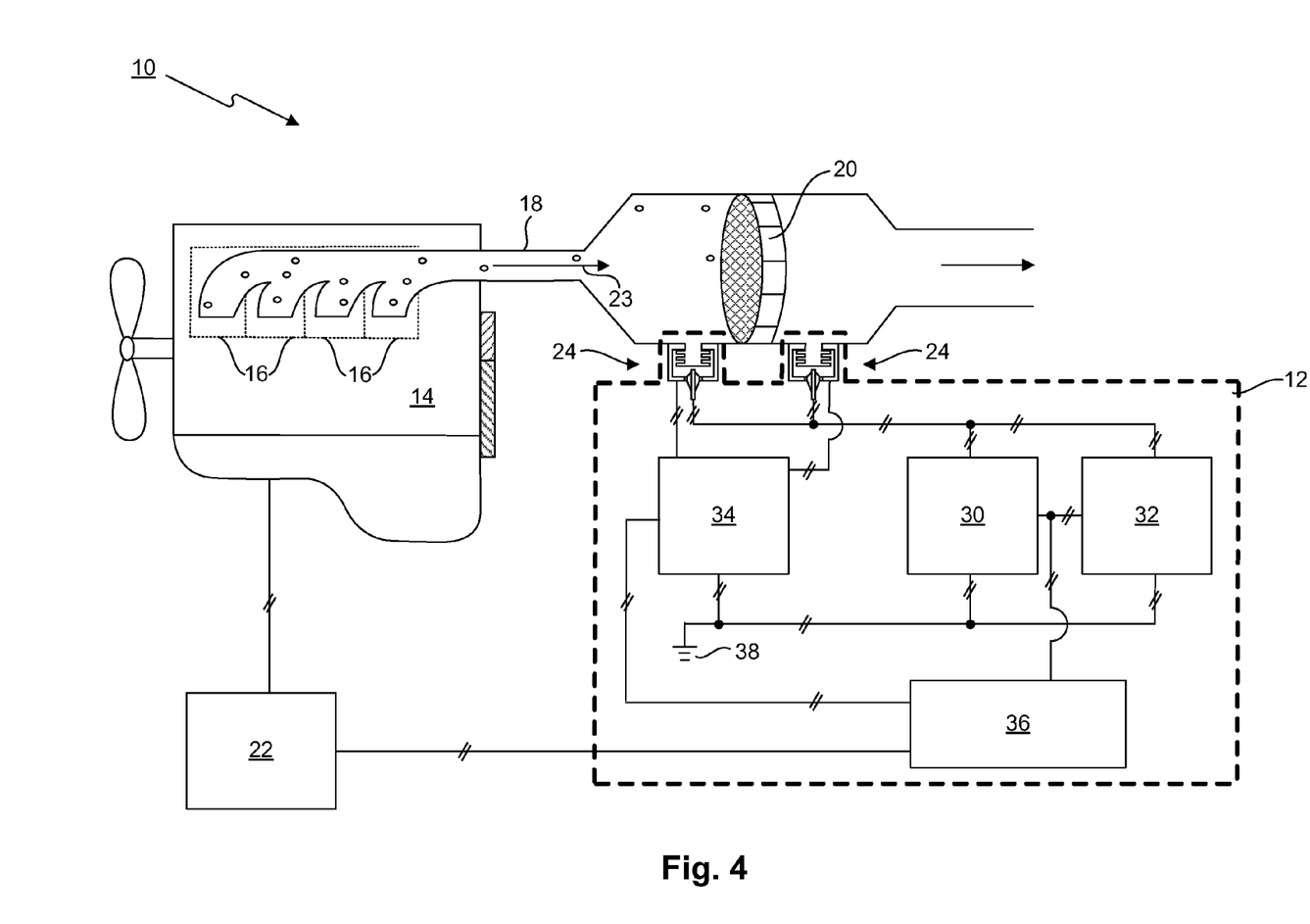
FIG. 4 is a is another exemplary disclosed gas monitoring system that may be used in conjunction with the power system of FIG. 1.

FIG. 4 illustrates an alternative embodiment of gas monitoring system 12. Similar to the embodiment of FIGS. 1 and 2, gas monitoring system 12 of FIG. 9 may include electrodes 24, pulse generator 30, voltage measurement device 32, current measurement device 34, and detection controller 36.

However, in contrast to the embodiment of FIGS. 1 and 2, gas monitoring system 12 of FIG. 4 may include an additional pair of electrodes 24, of the type illustrated in FIG. 3. The additional pair of electrodes 24 in the embodiment of FIG. 4 may be located downstream from the existing electrodes 24, for a total of at least two pairs of substantially identical electrodes 24 located on either side of treatment device 20. As will be described in more detail below, temperature information obtained via the pairs of electrodes 24 in the configuration of FIG. 4, may be utilized by detection controller 36 to monitor performance of treatment device 20.

INDUSTRIAL APPLICABILITY

The gas monitoring system of the present disclosure may be used in any application where knowledge of a pressure of a gas is important. The gas monitoring system may determine the pressure of the gas by selectively applying voltage pulses to electrodes 24, and measuring characteristics of resulting discharges in a reference gas. The characteristics may then be referenced with, for example, a lookup table to determine values of the parameters. Potential applications for the disclosed gas monitoring system include, among others, engine system or furnace applications. Operation of gas monitoring system 12 will now be described in detail.

Detection controller 36, utilizing electrodes 24 of FIG. 3, may first cause pulse generator 30 to generate and apply a series of voltage pulses to electrodes 24, each subsequent pulse in the series having an incrementally greater pulse amplitude $V_A$, until breakdown of the reference gas within discharge gap 42 is observed. When the applied voltage is greater than the breakdown voltage of the reference gas, the reference may begin to breakdown (i.e., to partially ionize) and an abrupt change in measured current an/or voltage may be observed. That is, at the time of breakdown, the voltage measured by voltage measurement device 32 may generally reduce, and the current measured by current measurement device 34 may sharply increase or spike. Detection controller 36 may then reference the $V_A$ that caused the breakdown, along with an assumed-constant pressure and constant temperature for the reference gas, with the lookup table stored in memory to determine a change in the discharge gap 42 (i.e., to determine how the gap between cathode 28 and anode 26 changed due to a pressure of the exhaust gas 23 pushing on cathode 28). Once discharge gap 42 (or a change in discharge gap 42) has been determined, the known elasticity of cathode 28 may be utilized to determine the pressure of the exhaust gas 23 as a function of discharge gap 42. Detection controller 36 may then rely on the determined pressure, to determine the value of a particular exhaust gas parameter.

During operation of the gas monitoring system 12 depicted in FIGS. 1 and 2, detection controller 36 may cause pulse generator 30 to generate and apply one or more voltage pulses to electrodes 24, thereby creating a plasma 44 between anode 26 and cathode 28 within the reference gas. In particular, as flexure of cathode 28 occurs, a magnitude of the force causing the flexure can be calculated based on a change in the discharge gap 42, the elasticity, and an area of cathode 28 exposed to the exhaust gas 23.

The gas monitoring system 12 shown in FIG. 4 may follow any of the processes described above to monitor performance of treatment device 20. Specifically, by determining a parameter of the exhaust gas 23 at a location upstream and at a location downstream of treatment device 20, conclusions about treatment device 20 may be drawn. For example, based on a pressure difference between the exhaust gas 23 upstream and downstream of treatment device 20, a restriction of treatment device 10 may determined. This restriction could relate to, for example, soot loading of a particulate filter.

Several advantages may be associated with gas monitoring system 12. For example, gas monitoring system 12 may be capable of rapidly determining a pressure of an exhaust gas 23 using short, low-voltage pulses, which may help to reduce energy consumption. In addition, utilizing voltage at the time of breakdown to determine pressure may reduce the effect of noise in the measurement. In addition, the applied voltage pulse may be on the order of microseconds to miliseconds, thus reducing a need for custom instrumentation.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A gas monitoring system, comprising:
   a first electrode in fluid communication with a first gas and a reference gas;
   a second electrode spaced apart from the first electrode to contain the reference gas between the first and second electrodes;
   a pulse generator configured to apply a series of voltage pulses to the first and second electrodes and create a plasma in the reference gas, wherein each subsequent voltage pulse in the series of voltage pulses has a higher voltage amplitude than a preceding voltage pulse in the series of voltage pulses;
   a detection controller in communication with the pulse generator and configured to:
      detect a breakdown of the reference gas during an application of one voltage pulse of the series of voltage pulses; and
      determine a pressure of the first gas based on a voltage amplitude of the one voltage pulse.

2. The gas monitoring system of claim 1, wherein the determining the pressure of the first gas includes:
   determining a discharge gap between the first and second electrodes based on the voltage amplitude of the one voltage pulse; and
   relating the discharge gap to the pressure of the first gas.

3. The gas monitoring system of claim 2, wherein the first electrode is flexible and the discharge gap changes during flexure of the first electrode as the pressure of the first gas changes.

4. The gas monitoring system of claim 1, wherein the determining the pressure of the first gas includes determining the pressure of the first gas at a first location and determining a pressure of the first gas at a second location, the first location being on a side of a gas treatment device opposite the second location 5. The gas monitoring system of claim 4, further including determining a parameter of the gas treatment device based on a difference between the pressure of the first gas at the first location and the pressure of the first gas at the second location.

6. The gas monitoring system of claim 5, wherein:
   the first gas is exhaust gas;
   the gas treatment device is a particulate filter; and
   the determining the parameter of the gas treatment device includes determining a soot loading of the particulate filter based on a difference between a pressure of the exhaust gas upstream of the particulate filter and a pressure of the exhaust gas downstream of the particulate filter.

7. A method for detecting a parameter of a first gas, the method comprising:
  applying a series of voltage pulses to electrodes in fluid communication with the first gas, wherein each subsequent voltage pulse in the series of voltage pulses has an incrementally higher voltage amplitude than a preceding voltage pulse in the series of voltage pulses;
  detecting a breakdown of a reference gas contained between the electrodes during application of one voltage pulse of the series of voltage pulses; and
  determining a pressure of the first gas based on a voltage amplitude of the one voltage pulse.

8. The method of claim 7, wherein the voltage pulses are controlled to generate a thermal plasma within the reference gas.

9. The method of claim 7, wherein determining the pressure of the first gas includes:
  determining a discharge gap between the electrodes based on the voltage amplitude of the one voltage pulse; and
  relating the discharge gap to the pressure of the first gas.

10. The method of claim 9, wherein the electrodes includes a first electrode that is flexible and
  wherein the discharge gap changes during flexure of the first electrode as the pressure in the first gas changes.

11. The method of claim 7, wherein the detecting the breakdown of the reference gas includes detecting at least one of a decrease in a voltage at the electrodes and an increase in current at the electrodes.

12. The method of claim 7, further including taking a corrective action when the parameter of the first gas exceeds a threshold level for the parameter.

13. The method of claim 7, wherein the determining the pressure of the first gas includes determining a pressure of the first gas at a first location and determining a pressure of the first gas at a second location, the first location being on a side of a gas treatment device opposite the second location.

14. The method of claim 13, further including determining a parameter of the gas treatment device based on a difference between the pressure of the first gas at the first location and the pressure of the first gas at the second location.

15. The method of claim 14, wherein:
  the first gas is exhaust gas;
  the gas treatment device is a particulate filter; and
  the determining the performance of the gas treatment device includes determining a soot loading of the particulate filter based on a difference between a pressure of the exhaust gas upstream of the particulate filter and a pressure of the exhaust gas downstream of the particulate filter.

16. A pressure sensor, comprising:
  a first generally cuplike electrode; and
  a second electrode operatively coupled to the first electrode to enclose a reference gas therebetween, the second electrode being flexible and configured to reduce a discharge gap between the first and second electrodes as an external pressure acting on the first and second electrodes increases.

17. The pressure sensor of claim 16, wherein the first and second electrodes are conductors selected from the group consisting of carbon nanotubes, carbon fibers, stainless or non-stainless steel, tantalum, platinum, tungsten, silver, gold, high-nickel alloys, and copper.

18. The pressure sensor of claim 16, wherein a spacing between the first electrode and the second electrode is greater than 1 mm.

19. The pressure sensor of claim 16, wherein the first electrode further includes a bellows-like structure that lengthens as the external pressure acting on the first electrode increases.

20. The pressure sensor of claim 16, further including:
  an insulator that separates the first and second electrodes, wherein the insulator is selected from the group consisting of aluminum oxide, aluminum nitride, porcelain, and boron nitride.

* * * * *